United States Patent [19]

Van Dijen

[11] Patent Number: 5,284,809
[45] Date of Patent: Feb. 8, 1994

[54] METHOD FOR THE PREPARATION OF ALPHA-ALUMINUM OXIDE POWDER

[75] Inventor: Franciscus Van Dijen, Dettighofen, Fed. Rep. of Germany

[73] Assignee: Lonza Ltd., Gampel/Valais, Switzerland

[21] Appl. No.: 978,503

[22] Filed: Nov. 18, 1992

[30] Foreign Application Priority Data

Nov. 22, 1991 [CH] Switzerland .......................... 3430/91

[51] Int. Cl.$^5$ .......................... C04B 35/10; C01F 7/02
[52] U.S. Cl. .................................. 501/127; 501/153; 423/625
[58] Field of Search ................ 501/127, 153; 423/625; 51/309

[56] References Cited

U.S. PATENT DOCUMENTS 4,623,364  11/1986  Cottringer et al. .................... 51/309

FOREIGN PATENT DOCUMENTS 113615  9/1980  Japan .

OTHER PUBLICATIONS

Somasundaran, P "Theories of Grinding" *Ceramic Processing Before Firing*, p. 114, Ed Onada & Hench, 1978.

*Primary Examiner*—Karl Group
*Assistant Examiner*—David R. Sample
*Attorney, Agent, or Firm*—Fisher, Christen & Sabol

[57] ABSTRACT

Aluminum oxide powders having a high α proportion, crystallite sizes of approximately 0.1 μm and narrow particle size distribution are prepared from customary Bayer aluminum hydroxide (gibbsite) or from aluminum oxide calcined at a low temperature. The starting material is wet-disagglomerated, mixed with α-aluminum oxide nuclei, dried and calcined. The calcination produces agglomerates which already have the crystallite size required, and which only need to be disagglomerated to the particle size required. The α-aluminum oxide powders prepared by such process are particularly suitable as a starting material for the production of high-performance ceramics, for example, of blanking dies.

19 Claims, 1 Drawing Sheet

METHOD FOR THE PREPARATION OF ALPHA-ALUMINUM OXIDE POWDER

BACKGROUND OF THE INVENTION

1. Field Of The Invention

The invention relates to a method for the preparation of very finely particulate α-aluminum oxide powder, in particular for the production of high-performance ceramics, from aluminum hydroxide (gibbsite or hydrargillite) or aluminum oxide which has been calcined at low temperature.

2. Background Art

α-Aluminum oxide powder has been prepared for many decades by the calcination of aluminum hydroxide. The calcination temperature in this process is usually above 1300° C. As the calcination temperature rises, the proportion of o-aluminum oxide increases, but at the same time so does the size of the primary crystals. The specific surface of the product, on the other hand, decreases with increasing calcination temperature. Powders to be used for the production of high-performance ceramics preferably have particle sizes below 1 μm. Ordinary calcination, however, produces agglomerates which are composed of primary crystals with sizes of the order of from 2 to 10 μm, and it is therefore necessary subsequently to mill the powder. Not only are the agglomerates broken down in this process, but the primary crystals are also reduced in size. Drawbacks of this procedure are the high expenditure of time and energy for milling, and the need for specific milling processes, not only so as to achieve the final size desired, but also to avoid contamination by abrasion from the milling device. Finally, the properties of the α-aluminum oxide powders thus obtainable are also adversely affected by their wide particle size distribution and the irregular particle shape. In contrast, the achievement of optimum results in high-performance ceramics requires powders having narrow particle size distributions and compact (equiaxed) particles; such powders, in spite of the compact particles, have a large specific surface. Such powders have been produced for some years from boehmite (AlOOH) according to the "seeded gel" process. In this case, boehmite is wet-mixed with α-Al₂O₃ nuclei, gelled, dried, calcined and wet-disagglomerated. A drawback of the process is the high price of the starting material boehmite.

BROAD DESCRIPTION OF THE INVENTION

The main objective of the invention is to provide a method for the preparation of α-aluminum oxide powder, which is based on inexpensive raw materials and produces a powder which has a narrow particle size distribution and which does not require additional milling in order to increase the specific surface. Other objectives and advantages of the invention are set out herein or are obvious herefrom to one skilled in the art.

The objectives and advantages of the invention are achieved by the processes and product of the invention.

The invention involves a method for the preparation of very finely particulate α-aluminum oxide powder. The method includes preparing a suspension from a precursor of α-aluminum oxide and, optionally, conventional additives, drying, calcining and milling or disagglomerating. As a precursor of α-aluminum oxide aluminum hydroxide (Al(OH)₃) or an aluminum oxide obtained therefrom by calcination at low temperature is used and, to form the suspension, is subjected to a milling and disagglomeration treatment.

Preferably the aluminum hydroxide used is the aluminum hydroxide obtained in the alumina production according to the Bayer process. Preferably the milling and disagglomeration treatment is carried out with an attritor, a vibratory mill or a stirred mill. Preferably the attritor, the vibratory mill or the stirred mill is operated with a grinding medium consisting of bodies made predominantly of α-aluminum oxide. Preferably the suspension is admixed with crystallization nuclei of a α-aluminum oxide. Preferably the calcination is carried out at a temperature of from 1000° to 1300° C., more preferably at a temperature of from 1100° to 1200° C.

The invention also involves powder on the basis of aluminum oxide and optionally additives of further oxides, obtainable by the invention method. Preferably α-aluminum oxide powder has a primary crystal size of less than 0.3 μm.

The invention further involves use of the invention α-aluminum oxide powder for the preparation of sintered α-aluminum oxide, for example, as a ceramic insert.

BRIEF DESCRIPTION OF THE DRAWING

In the drawing:

FIG. 1 is a SEM picture of the agglomerated material produced in Example 1.

DETAILED DESCRIPTION OF THE INVENTION

It has been found, surprisingly, that it is possible by a suitable combination of process steps to obtain, even from ordinary technical grade aluminum hydroxide [Al(OH)₃], gibbsite, also called hydrargillite], as produced by the Bayer process, α-aluminum oxide powder having a crystallite size of less than 1 μm, preferably even less than 0.3 μm, and a specific surface of 5 to 100 m²/g without milling of the α-aluminum oxide.

Instead of the aluminum hydroxide, one can also use, in the method according to the invention, aluminum oxides which have been calcined at low temperature, or mixtures of the latter and aluminum hydroxide. The aluminum oxides calcined at low temperature still contain some water, for example, approximately 8 percent by weight, and during the treatment according to the invention they are reconverted into aluminum hydroxide, taking up water, as can be shown by thermogravimetric testing of the dried suspension.

According to the invention, the aluminum hydroxide, or the aluminum oxide calcined at low temperature, serving as the starting material is first wet-milled or disagglomerated, in order to break up the agglomerates, which are present as a consequence of the production method, into the individual crystallites. The disagglomeration or milling is preferably carried out in an attritor, a vibratory mill or a stirred mill; the grinding medium preferably comprising bodies which consist, wholly or predominantly, of aluminum oxide. The amount of liquid is preferably chosen so as to produce a suspension with a solids content of 10 to 40 percent by weight. The liquid used is preferably water. The aluminum hydroxide suspension is expediently admixed with crystallization nuclei, preferably nuclei of α-aluminum oxide. These nuclei can be obtained, for example, simply by milling α-aluminum oxide, for example, in the form of calcined alumina, down to a particle size less than 1 μm.

The nuclei are added preferably in amounts from 1 to 5 percent by weight, based on the total amount (calculated as $Al_2O_3$), and mixed in thoroughly. Particularly preferred is the addition at the start or during the disagglomeration or milling of the starting material. In addition to the crystallization nuclei, auxiliaries or additives, such as, antifoaming agents, sinter aids, crystal growth inhibitors, liquefiers, etc., may optionally be added. The method according to the invention, however, does not require such additives.

The suspension thus obtained is then dried, for example by spray drying. The material thus obtained is then calcined. The calcination temperature is expediently at from 1000° to 1300° C., preferably at from 1100° to 1200° C.

The powder prepared according to the invention is notable for a high α (alpha) proportion, a high specific surface and a crystallite size in the order of magnitude of 0.1 μm. After calcination, the powder exhibits strong agglomeration and subsequently has to be subjected to a disagglomeration treatment.

The disagglomeration also is preferably carried out in an attritor, a vibratory mill or a stirred mill; the grinding medium again preferably comprising bodies made of aluminum oxide. The particle size distribution after disaggglomeration depends on the duration of the disagglomeration treatment and on the proportion of solids in the treatment. By suitable choice of the parameters it is possible, for example, with solids contents of 25 percent and treatment duration in the order of magnitude of 1 hour, to achieve particle size distributions in which 90 percent of the material has a particle size of less than approximately 0.4 μm. The mean particle size in this instance is only slightly larger than the mean crystallite size, and there is no significant size reduction of the individual crystals.

The following examples illustrate the working of the method according to the invention.

EXAMPLE 1

In an attritor (0.6 l), 70 g of aluminum oxide calcined at low temperature (type AX from Martinswerk GmbH, D-W 5010 Bergheim) were milled and disagglomerated for 1 hour in desalinated water with the addition of 1.0 percent by weight (based on the aluminum oxide) of α-aluminum oxide nuclei, using aluminum oxide balls (d=1 mm). The agglomerate size after milling was to 100 percent (1 μm. The α-aluminum oxide nuclei were obtained by milling of high-temperature calcined aluminum oxide in an attritor to a particle size of (0.5 μm. The pH was set to 2 by the addition of hydrochloric acid. The suspension was dried in a drying oven at 70° C. The dried material was milled to a particle size of (0.1 mm and calcined for 30 minutes at 1150° C. The specific surface (according to BET) of the calcined product was 20 $m^2/g$, the α proportion was 94 percent.

EXAMPLE 2

The same procedure was followed as in Example 1, except that the material was calcined at 1200° C. instead of at 1150° C. The specific surface was 14 $m^2/g$, and the α proportion was 100 percent. The mean crystallite size after calcination was 0.11 μm. The still agglomerated product thus obtained is shown in the Figure. The SEM picture clearly shows the loose agglomerate structure consisting of crystallites of the order of magnitude of 0.1 μm. The calcined material was disagglomerated for an hour, in an attritor, in water at a solids content of 50 percent and 25 percent. The grinding medium used consisted of aluminum oxide balls with a diameter of 1 mm. The particle size distribution (determined by the laser scattering method, expressed in percent volume) was:

| Disagglomeration at 50% solids content | Disagglomeration at 25 solids content |
| --- | --- |
| 90% < 0.7 μm | 90% < 0.3 μm |
| 50% < 0.2 μm | 50% < 0.2 μm |
| 10% < 0.1 μm | 10% < 0.1 μm |

EXAMPLE 3 (Comparative Example)

The same procedure was followed as in Example 2, except that the starting material was not disagglomerated and that no α-aluminum oxide nuclei were admixed. The specific surface was 11 $m^2/g$, but the o proportion was only 75 percent. The mean particle size was 0.14 μm.

EXAMPLE 4 (Comparative Example)

A commercially available α-aluminum oxide powder (Type CS-400/M, from Martinswerk) which was prepared and milled according to the prior art by calcination of aluminum hydroxide without disagglomeration and without admixture of nuclei (particle size distribution: 90 percent <1.3 μm, 50 percent <0.8 μm and 10 percent <0.2 μm, specific surface 11 $m^2/g$) was additionally treated, as described in Example 2, for 1 hour in an attritor, at a solids content of 25 percent. Afterwards, the particle size distribution was 90 percent <0.7 μm, 50 percent <0.3 μm, 10 percent <0.15 μm, therefore, considerably wider and more coarsely particulate than after the corresponding example according to the invention, even though the material had already been ground after calcination.

What is claimed is:

1. A method for the preparation of very finely particulate α-aluminum oxide powder comprising:
   (a) forming a suspension of a precursor of α-aluminum oxide and sufficient liquid to provide a solids content in the suspension of 10 to 40 weight percent, the precursor of α-aluminum oxide being aluminum hydroxide, $Al(OH)_3$;
   (b) wet-milling and disagglomerating the suspension to disagglomerate agglomerates of the aluminum hydroxide;
   (c) drying the disagglomerated suspension to provide a dried particulate material;
   (d) calcining the dried particulate material at a temperature of from 1000° to 1300° C.; and
   (e) milling and disagglomerating the calcined particulate material (d) to disagglomerate the calcined particulate material (d) to provide the very finely particulate α-aluminum oxide powder.

2. The method according to claim 1 wherein the aluminum hydroxide used is aluminum hydroxide obtained in alumina production according to Bayer process.

3. The method according to claim 2 wherein the milling and disagglomeration of the suspension is carried out with an attritor, a vibratory mill or a stirred mill.

4. The method according to claim 3 wherein the attritor, the vibratory mill or the stirred mill is operated with a grinding medium consisting of bodies made predominantly of α-aluminum oxide.

5. The method according to claim 4 wherein, before being milled and disagglomerated, the suspension is admixed with crystallization nuclei of α-aluminum oxide.

6. The method according to claim 5 wherein the calcination of the dried particulate material is carried out at a temperature of 1100° to 1200° C.

7. The method according to claim 1 wherein the milling and disagglomeration of the suspension is carried out with an attritor, a vibratory mill or a stirred mill.

8. The method according to claim 7 wherein the attritor, the vibratory mill or the stirred mill is operated with a grinding medium consisting of bodies made predominantly of α-aluminum oxide.

9. The method according to claim 1 wherein, before being milled and disagglomerated, the suspension is admixed with crystallization nuclei of α-aluminum oxide.

10. The method according to claim 1 wherein the calcination of the dried particulate material is carried out at a temperature of 1100° to 1200° C.

11. The method according to claim 1 wherein the α-aluminum oxide powder has a primary crystal size of less than 0.3 μm and a specific surface of 5 to 100 m$^2$/g.

12. A method for the preparation of very finely particulate α-aluminum oxide powder comprising:
(a) forming a suspension of a precursor of α-aluminum oxide and sufficient water to result in the suspension, the precursor of α-aluminum oxide being aluminum hydroxide, Al(OH)$_3$;
(b) wet-milling and disagglomerating the suspension to disagglomerate agglomerates of the aluminum hydroxide;
(c) drying the disagglomerated suspension to provide a dried particulate material;
(d) calcining the dried particulate material at a temperature of from 1000° to 1300° C.; and
(e) milling and disagglomerating the calcined particulate material (d) to disagglomerate the calcined particulate material (d) to provide the very finely particulate α-aluminum oxide powder.

13. The method according to claim 12 wherein the aluminum hydroxide used is aluminum hydroxide obtained in alumina production according to Bayer process.

14. The method according to claim 12 wherein amount of the water is sufficient to provide a solids contents in the suspension of 10 to 40 weight percent.

15. The method according to claim 12 wherein the milling and disagglomeration of the suspension is carried out with an attritor, a vibratory mill or a stirred mill.

16. The method according to claim 15 wherein the attritor, the vibratory mill or the stirred mill is operated with a grinding medium consisting of bodies made predominantly of α-aluminum oxide.

17. The method according to claim 12 wherein, before being milled and disagglomerated, the suspension is admixed with crystallization nuclei of α-aluminum oxide.

18. The method according to claim 12 wherein the calcination of the dried particulate material is carried out at a temperature of 1100° to 1200° C.

19. The method according to claim 12 wherein the α-aluminum oxide powder has a primary crystal size of less than 0.3 μm and a specific surface of 5 to 100 m$^2$/g.

* * * * *